(No Model.) 6 Sheets—Sheet 5.
O. G. CRITCHETT.
MECHANISM FOR PREPARING BOOT OR SHOE UPPERS FOR LASTING.
No. 289,391. Patented Dec. 4, 1883.
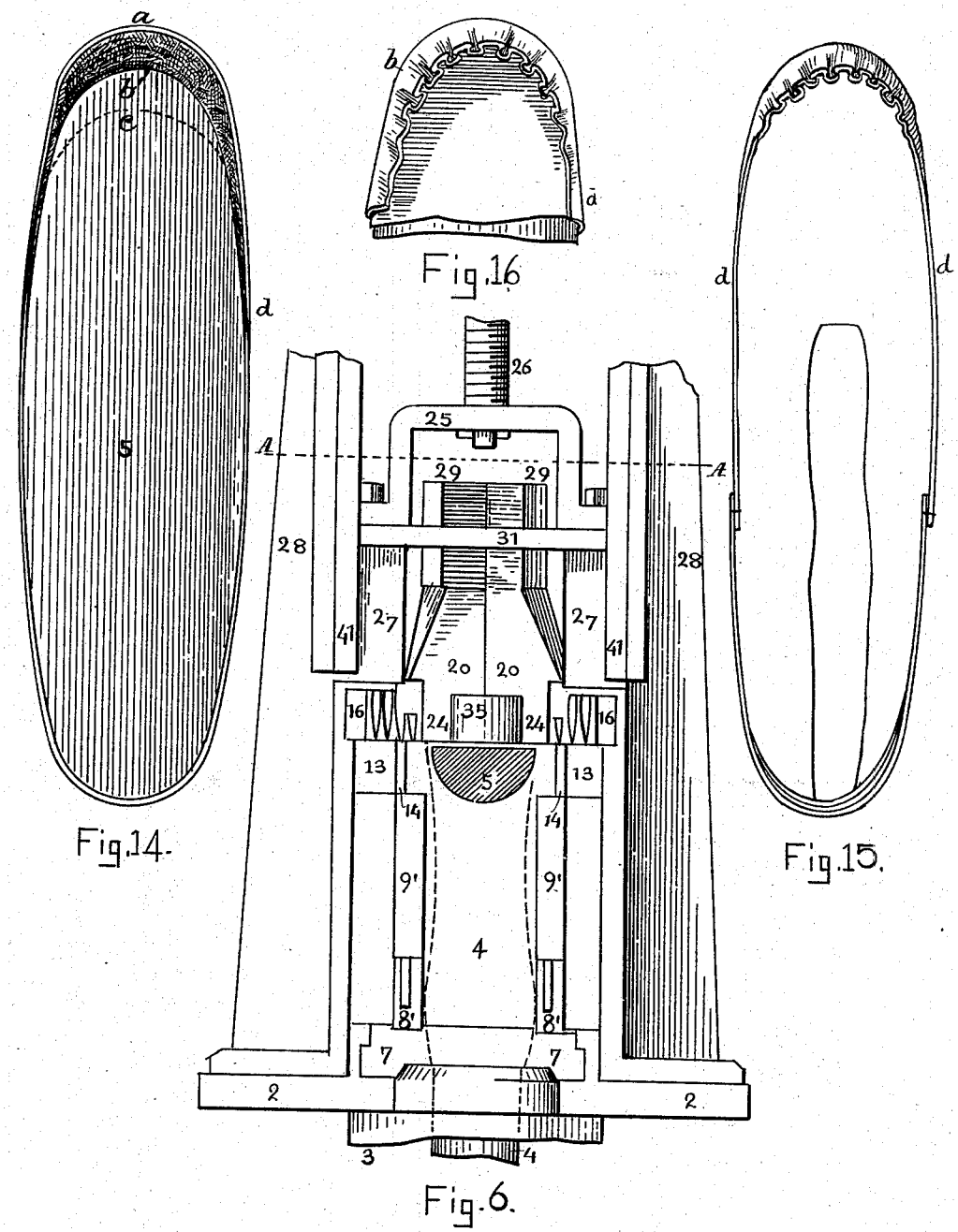
Witnesses:
Harry E. Kenick
Eugene F. Humphrey
Inventor:
Oliver G. Critchett
By Porter & Hutchinson
Atty.

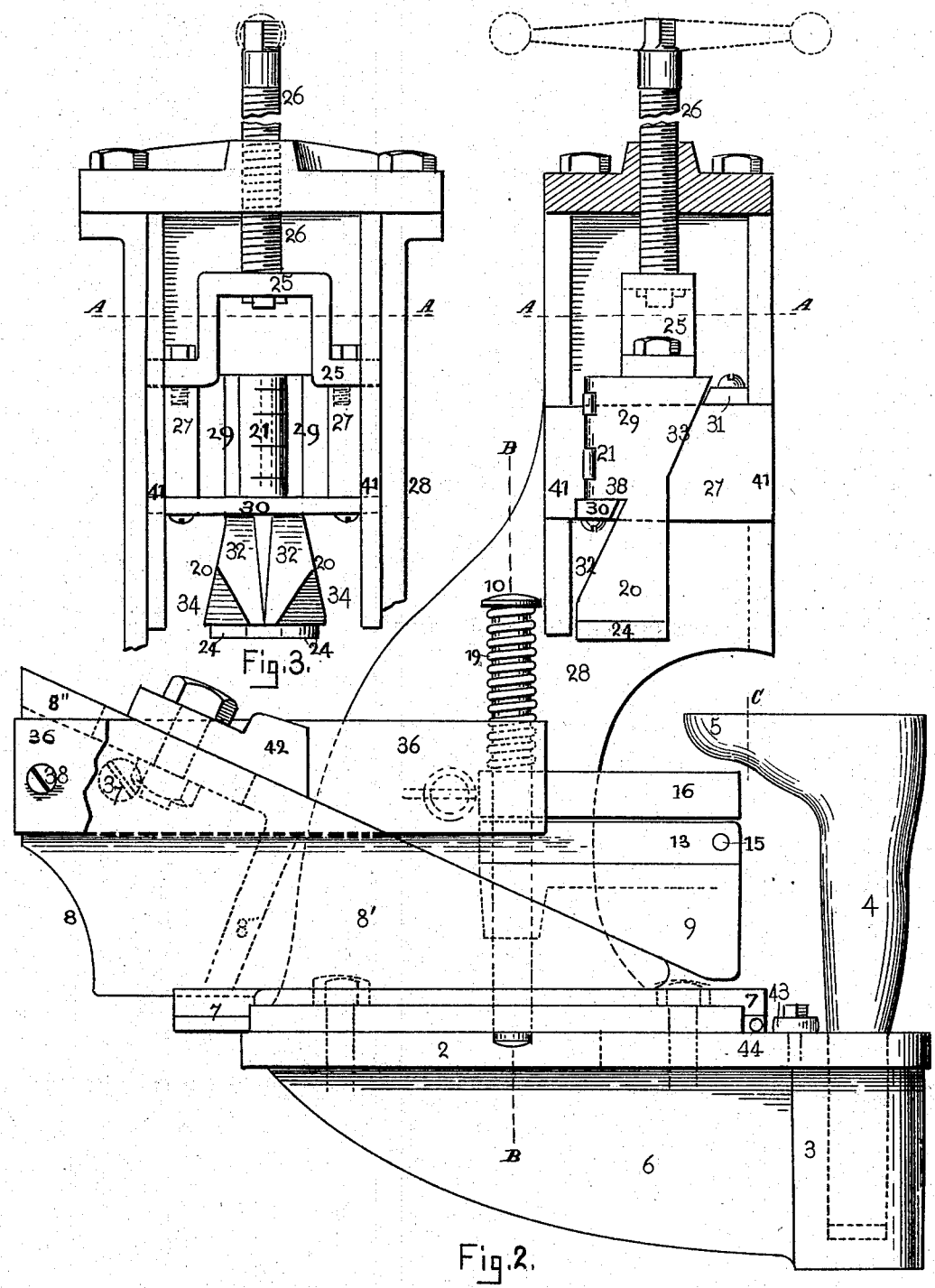

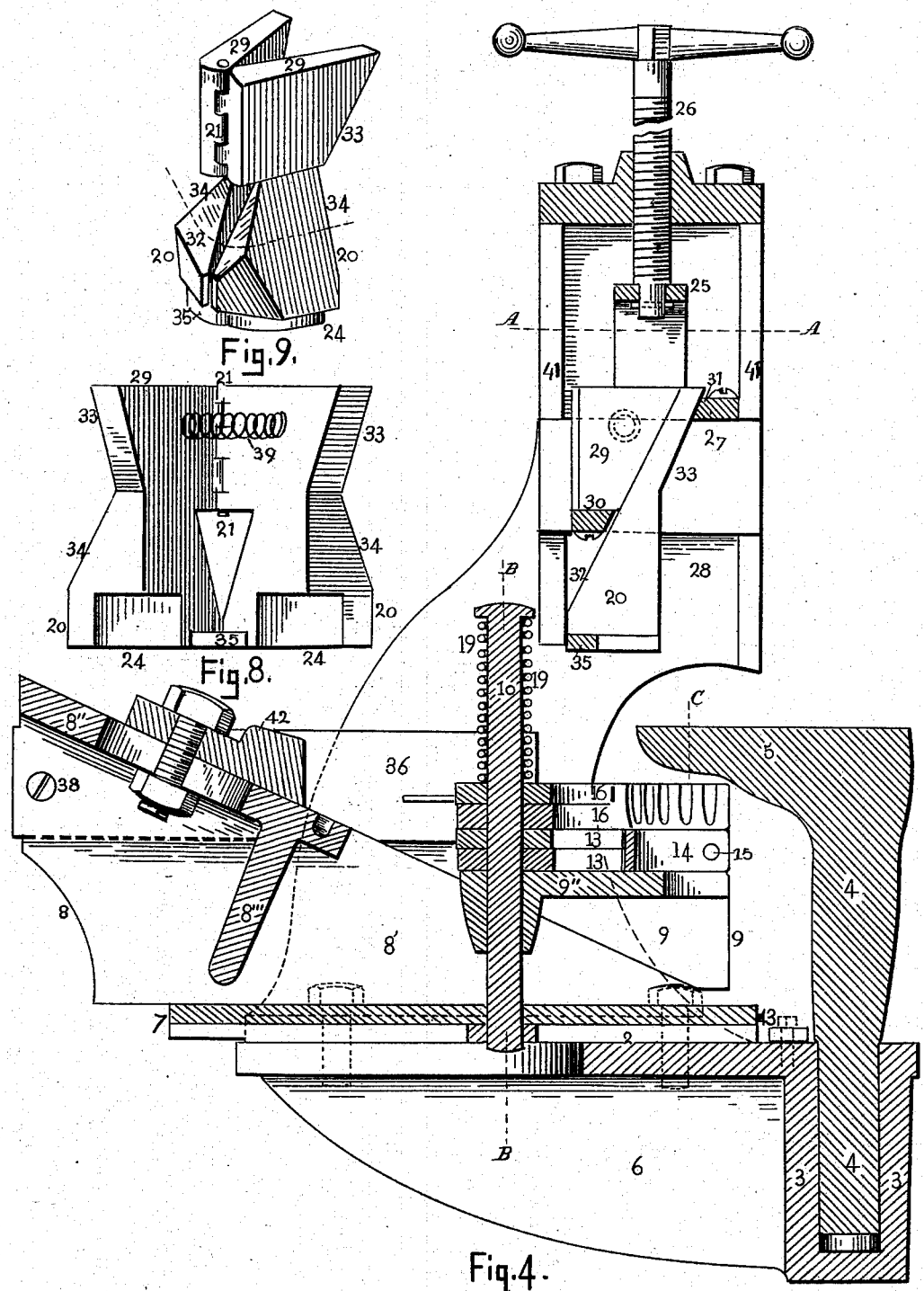

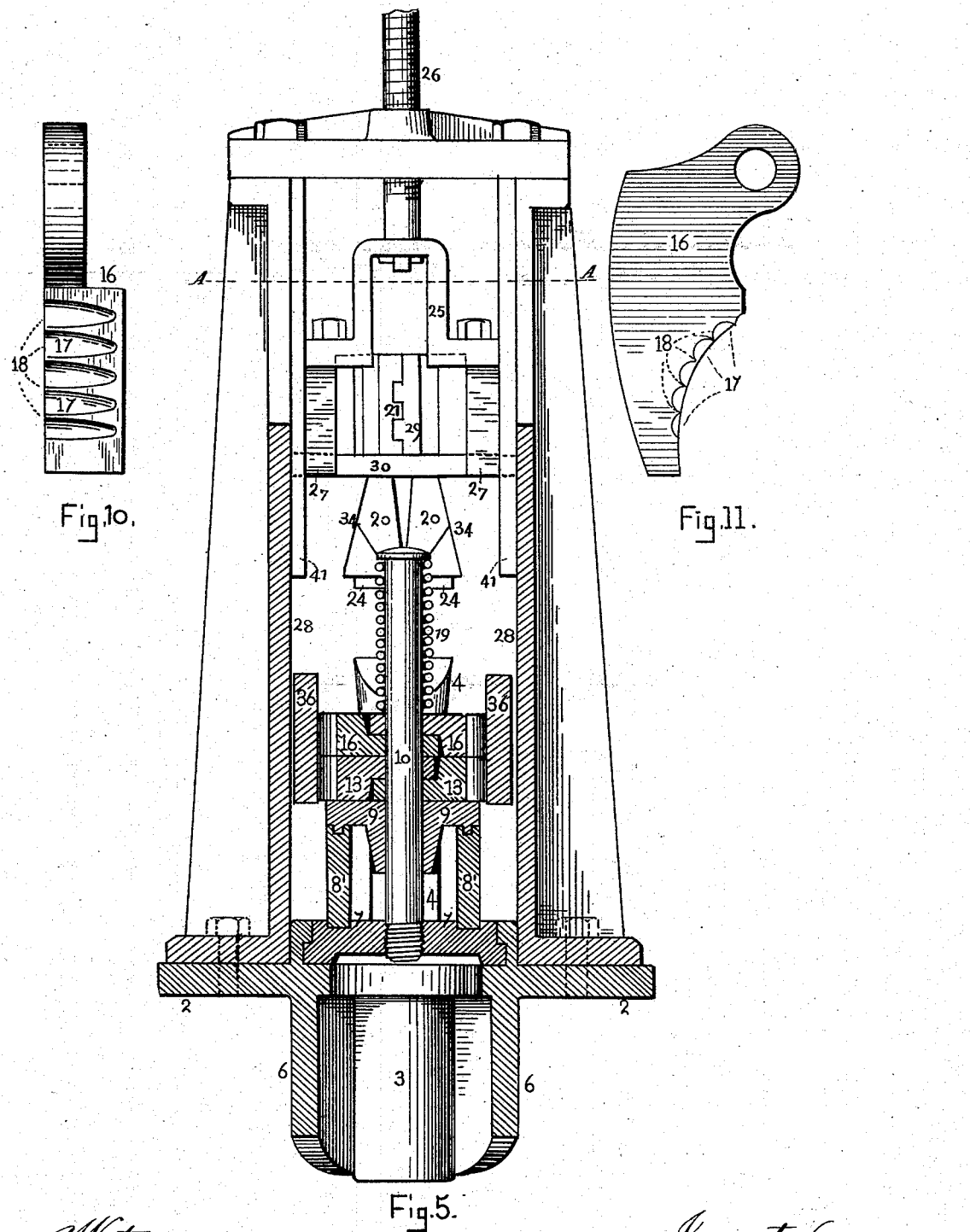

(No Model.) 6 Sheets—Sheet 6.

O. G. CRITCHETT.
MECHANISM FOR PREPARING BOOT OR SHOE UPPERS FOR LASTING.

No. 289,391. Patented Dec. 4, 1883.

Witnesses
Harry E. Nemick
Eugene Humphrey

Inventor
Oliver G. Critchett
By Porter & Hutchinson Attys

UNITED STATES PATENT OFFICE.

OLIVER G. CRITCHETT, OF BELFAST, MAINE.

MECHANISM FOR PREPARING BOOT OR SHOE UPPERS FOR LASTING.

SPECIFICATION forming part of Letters Patent No. 289,391, dated December 4, 1883.

Application filed January 11, 1883. (No model.)

*To all whom it may concern:*

Be it known that I, OLIVER G. CRITCHETT, of Belfast, in the county of Waldo and State of Maine, have invented new and useful Improvements in Preparing Boot or Shoe Vamps for Lasting, which invention is fully set forth in the following specification, reference being had to the accompanying drawings.

Figure 1:
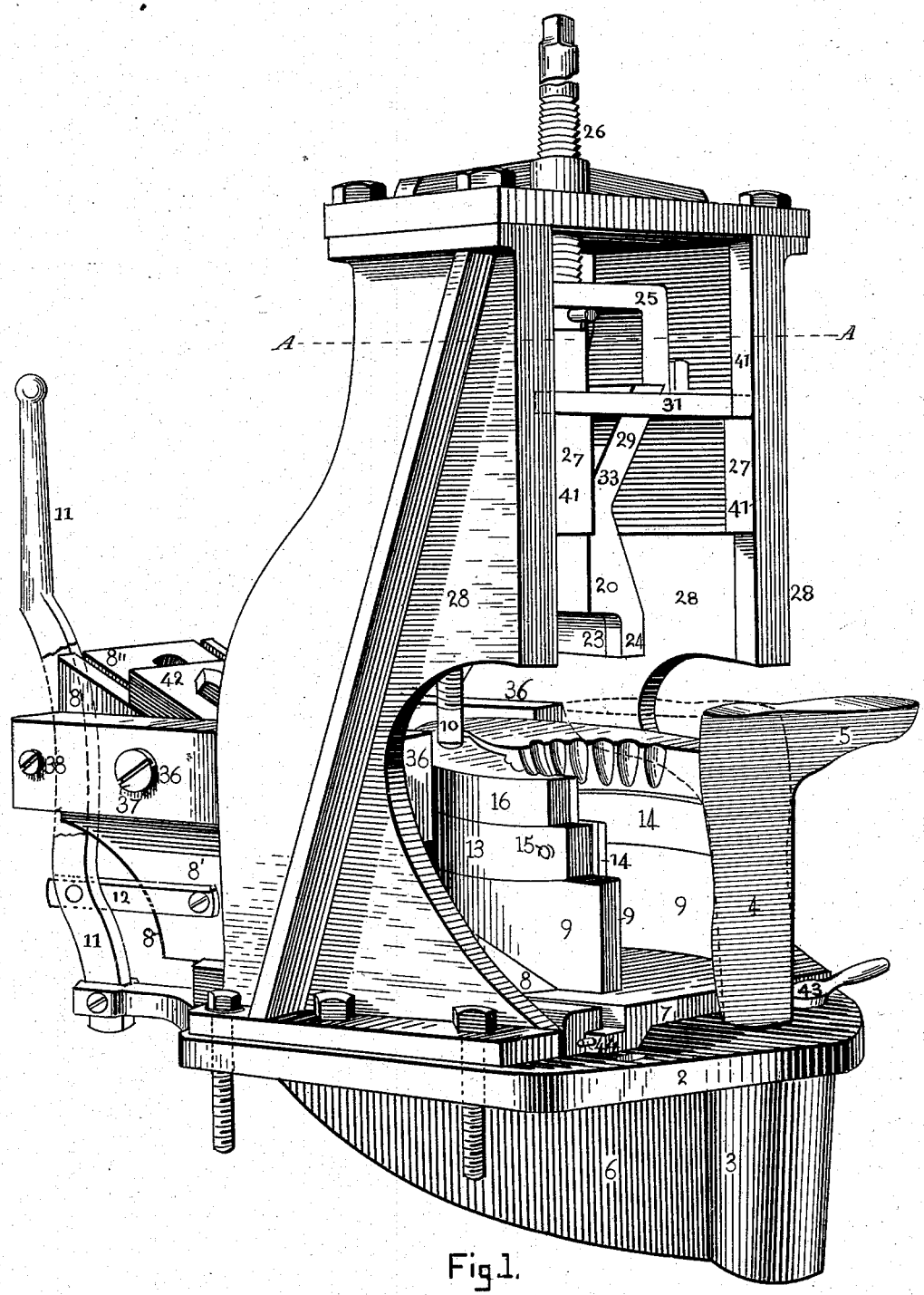
Figures 7, 12, 13:
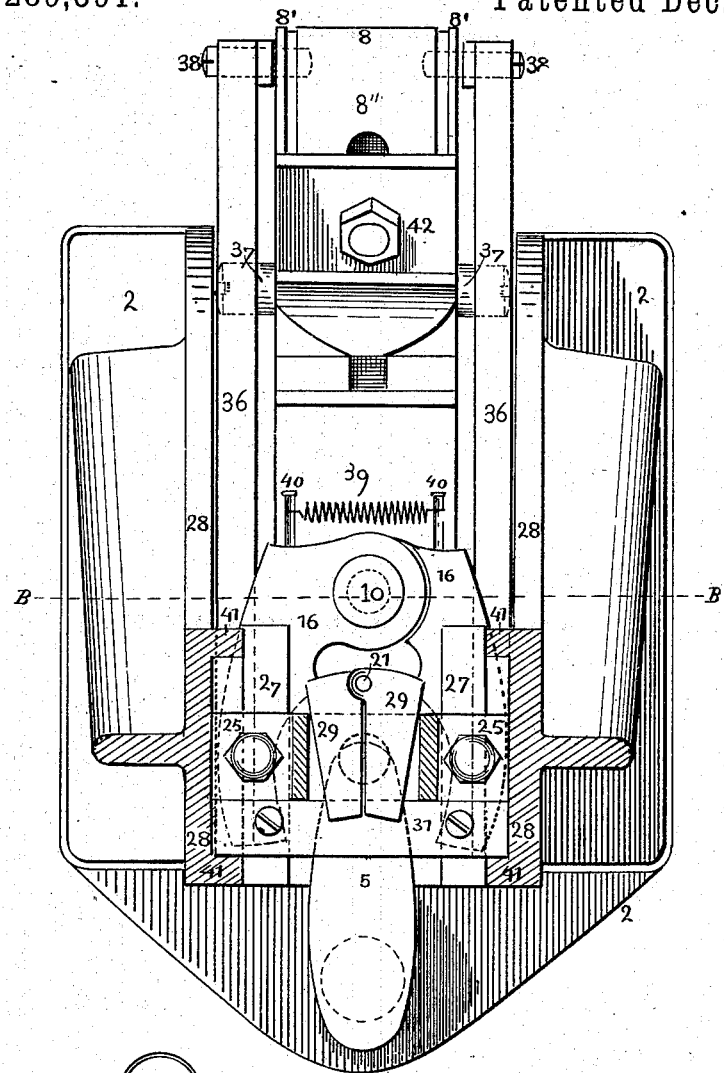

Figure 1 is a perspective view of my improved machine. Fig. 2 is a side sectional elevation of the same, the cap being shown in transverse section, and the hither cheek of the frame being removed to show the operative parts. Fig. 3 is a detached rear elevation of the upper portion of the machine, the same being viewed as from the left in Fig. 2. Fig. 4 is a longitudinal vertical section of the machine viewed from the same standpoint as in Fig. 2. Fig. 5 is a sectional elevation, the section being taken as on line B B, Figs. 2, 4, 7, and the view being as from the left in Figs. 2 and 4. Fig. 6 is a front elevation of the lower part of the machine viewed from the right, as in Figs. 1, 2, 4, and showing the lasting-form in vertical section on line C, Figs. 2 and 4. Fig. 7 is a sectional plan view of the machine, the portion above line A A, Figs. 1, 2, 3, 4, 5, 6, being removed. Fig. 8 is a detached front elevation of the interior dies. Fig. 9 is a side and rear perspective of the dies shown in Fig. 8. Fig. 10 is a side or edge elevation of one of the corrugated crimping-jaws. Fig. 11 is a top or plan view of the jaw shown in Fig. 10. Fig. 12 is an inverted or under side plan view of the interior dies shown detached in Figs. 8, 9. Fig. 13 is a detached top or plan view, showing the toe portion of the supporting-form, the corrugated jaws, and the shoe-upper as being compressed between the form and jaws, and being corrugated, the interior jaws being shown by dotted lines. Fig. 14 is a plan view of the supporting-form with the upper thereto applied preparatory to crimping. Fig. 15 is a perspective view of a boot or shoe upper after being crimped and molded by my method. Fig. 16 is a view similar to Figs. 14 and 15, showing the toe part of the last and insole, and the upper thereto applied, preparatory to being fastened, after being treated by my improved method. Fig. 17 shows the toe portion of a last, insole, and upper, the latter shown as being lasted in the usual manner.

Heretofore, when lasting shoes by hand, the upper was first placed upon the last on which the bottoming was to be done, and was secured in proper position at the heel by a tack. Then the toe portion was grasped by pinchers and drawn back upon the insole and secured by a tack, as shown in Fig. 17, after which that portion of the upper which overlies the insole around the toe was subdivided by slits, and these subdivisions were folded down one upon the other, or else the overlay border of the upper was serrated like saw-teeth by cutting away alternate triangular portions thereof, so that the remaining portions would fold down side by side upon the border of the insole, when the remaining portion of the upper, along the sides and around the heel, was easily turned down and secured to the insole, as all such bottom portions of the upper are either at right angles to the plane of the insole or are turned slightly inward, as at the heel, by reason of the curvature of the seams; and when lasting by machinery it has always been found necessary to draw back the toe portion of the upper, as shown in Fig. 17, and secure the same by one or more tacks before subjecting the upper to the action of the machine. The necessity for this method of treatment arises from the peculiar relations of the upper to the surface of the last or insole at the toe when brought together, for while all the other portions of the upper are at or very near a right angle to the surface or plane of the insole, and hence are easily folded down, the toe portion of the upper is more nearly in the same plane as the insole than at a right angle thereto, as shown in Figs. 14 and 16, where *a* represents the outer line of the upper when first placed upon the last. *b* is the line of the toe of the last, and *c* the line to be occupied by *a* when the upper is turned back upon the last; and hence in proportion as line *c* is of less radius, and therefore less length, than line *a*, the greater the consequent surplus of leather between lines *a* and *b*, which must be disposed of when folded back upon the last; and, as above stated, this has heretofore been done, when lasting by hand, by slitting and cutting out portions like saw-teeth, or by slitting and overlaying, and when lasting by machinery by either slitting or by doubling in the surplus at the sides after first drawing in the center, as shown in Fig. 17.

My method of lasting consists, primarily, in corrugating, crimping, or plaiting and molding the toe of the upper upon an iron form, with suitable coacting devices as a preparatory process, and before the upper, the last, and insole are brought together, by which method and means that portion of the toe of the upper shown between lines a and b, Fig. 14, is first turned at right angles to the plane of the form, or of the lower edge of the upper, and is thrown into uniform corrugations, as shown in Fig. 13, and is next turned back and inward, as shown in Fig. 16, and is at the same time laid in folds or plaits coincident with the previous corrugations, and is by the same movement compressed with great force between the iron form or bed and the folding jaws, so as to be permanently set or molded at the toe to fit the last and insole when applied thereto. After the toe of the upper is thus molded to conform to the toe of the last and insole, the upper may be placed upon the last, and the entire remaining portion of the edge be readily folded down upon the insole, either by automatic devices or by hand.

In the accompanying drawings are shown novel devices for producing the described operations upon the upper, with devices for actuating the same; but such actuating devices may varied or supplemented by others, as greater force or rapidity of action may render necessary.

In said views, 2 represents the bed of the machine, which at the front end is provided with the depending hollow boss or socket 3, in which is pivotally seated the shank 4 of the supporting-form 5. To avoid undue size of shank 4, it is bottomed, for support, in socket 3, instead of being shouldered upon bed 2, and by means of thin washers it may be elevated to bring form 5 at the exact height required for its co-operation with the other devices. Two diverging ribs, 6, formed upon bed 2 and socket 3, cause the same to be mutually supporting. A plate, 7, is arranged in ways upon bed 2, and is not only adapted to slide therein, but has, as will be described, a slight sliding motion imparted to it. Upon plate or bed 7 is arranged to slide freely an incline, 8, which is formed with the sides 8' 8', united by plate 8'' and vertical rib 8''', all preferably formed as a single casting. A reversed and shorter incline (marked 9) is seated upon incline 8, and is secured thereon by "tongues and grooves," respectively formed therein, as shown in Figs. 5 and 6. This lesser incline is, like incline 8, formed with the sides 9' 9' and with a uniting-top, 9'', as shown in Fig. 4, and a hollow boss on the same receives the standard 10, secured rigidly in sliding bed 7, the top of said slide 8 being cut away, so as not to engage said standard.

Said incline 8 is moved back and forth on bed 7 by lever 11, pivoted to a projection on bed 2, and connected with incline 8 by rod 12, as shown in Fig. 1, or by any suitable means by hand or power.

A pair of jaws, 13 13, are pivoted on standard 10, the interior faces of which are smooth, and are lined with an elastic spring, 14, which in its normal position is of slightly less curve than the interior line of said jaws when closed, and so tends to open the jaws when not otherwise controlled. Said spring is held in position relatively to the jaws by pins 15, which are secured to the spring near its ends, and pass loosely through corresponding holes in the jaws. Said jaws rest upon the upper face of incline 9, and are raised by the same when incline 8 is moved forward thereunder. An upper pair of jaws, 16 16, are also pivoted upon standard 10, and rest upon the upper side or face of jaws 13, and upon their inner faces are formed with grooves 17, which extend downward from the upper line of the face with a diminishing depth, and terminate just above the lower line of the face. The remaining metal between grooves 17 constitutes ribs or teeth 18, as shown. These jaws are shown in plan and edge elevation in Figs. 10, 11. A helical spring, 19, is arranged on standard 10 between jaws 16 and a thin head or set-collar at the top of the standard, Figs. 2, 5, which constantly acts upon the jaws and causes them to bear upon incline 9, whether the same rises or falls. A pair of jaws, 20 20, are hinged together at 21 in the upper extension, 29, thereof, Figs. 2, 3, 8, 9. The lower end of these jaws (shown in plan in Fig. 12) is formed with a concave line, 22, of less radius than that of the toe of form 5, and they are shouldered down at 23, thereby leaving a projecting face, 24, which acts upon the upper of the shoe, as will be described. Said jaws 20 are supported and actuated as follows: A stirrup, 25, is attached to screw 26 by a pivotal stem of the latter, and is secured thereon by a supporting-pin in the stud, Figs. 2, 3, and said stirrup is secured, as shown in said figures, to the guide-bars 27, which bear against and are guided by the inner faces of the side standards, 28, which are secured to the main bed 2. A cross-bar, 30, is secured to the bottom of side bars 27, and a similar cross-bar, 31, is secured to the top thereof, said cross-bars 30 and 31 extending not only entirely across bars 27, but inside of the projecting ledges 41, formed on the inner sides or faces of standards 28, whereby bars 27 serve as lateral guides, while bars 30 31 serve as guides to prevent bars 27 from displacement toward the front or rear. The rear side of jaws 20 is formed inclined, as shown at 32, while the front face of extension 29 is formed with an incline, 33, the prolongation of which would be parallel with incline 32, and the cross-bars 30 31 are beveled and arranged to respectively engage said faces, as shown in Fig. 2. When screw 26 is turned upward the requisite distance, jaws 20 are supported on cross-bar 31 by the engagement of the under shoulder of extension 29, as shown in said Fig. 2, and when said screw is turned downward, jaws 20 retain their position relative to cross-bars 30 31 till the lower face, 24, of the jaws encounters the upward edge of the upper of the shoe, when bar 30 begins to slide downward upon incline 32, thereby forcing the jaws forward, while screw 26 continues to force them downward, at the same time bar 31 moving down vertically, and so releasing or moving from incline 33 in the same ratio as bar 30 moves the jaws forward, and when screw 26 moves upward, bar 31 moves the jaws backward to first position, as shown in Fig. 2. When bar bar 30 begins to act on incline 32, as stated, the side bars 27 encounter the side faces or inclines, 34, of jaws 20, and thereby force them inward, they turning on their hinge 21 at the rear of extension 29. Thus the jaws 20, when being operated, have a threefold movement. They descend, move forward by the action of cross-bar 30, and swing inward on the pivot of hinge 21 by the action of side bars 27.

In the lower face of one of the jaws 20 is secured steel die 35, which is recessed into projecting wall 24, so as to extend at all times across the space or joint between said jaws, so as to present a continuous line of bearing against the shoe-upper when the jaws act thereon. The two pairs of jaws 13 13 and 16 16, which are pivoted on the standard 10, are forced inward by the action of pressure-bars 36 36, which are adjustably attached to sides 8' of incline 8 by adjusting-screws 37 37 and 38 38, as shown in Figs. 1, 2, 4, so as to produce the requisite pressure upon different-sized jaws, said bars moving forward with their said supporting-slide and forcing inward the jaws 13 16, as stated.

Having described the several operative parts of my machine and their immediate relations to each other, I will now describe the practical operation of the machine, taking the several details or movements in their operative order.

Form 5 being swung to the right, as shown in Fig. 1, the upper $d$ of the boot or shoe is placed thereon, as shown in Fig. 14, when the form is swung into axial or central relation to the machine, as shown in Figs. 2, 4, 6, 7, when incline 8 (which had been withdrawn) is moved forward, thereby bringing its side bars 36 in contact with and closing in the toothed jaws 16 and the lower smooth jaws, 13, which closing in occurs before jaws 16 rise sufficiently to act on the shoe-upper; but as incline 8 advances it forces up the short incline 9 and the jaws 13 and 16 resting thereon, whereby jaws 16 first encounter the upper directly after they are forced inward by bars 36, and, as the jaws continue to rise, their teeth 18 encounter and force inward the shoe-upper, which extends beyond the toe of form 5, as shown at $a$, Fig. 14, and as the jaws still rise, and the groove 17 and teeth 18 become more and more shallow, such projecting border $a$ of the upper is forced into plaits coincident with the grooves or teeth in the jaws, and is turned upward and slightly inward relatively at a right angle to the top of form 5. When the smooth or continuous line of the lower edge of jaws 16 has passed the upper face of form 5, the spring-lining 14 of jaws 13 begins to act on the upper and secures the same in position as left by jaws 16, which latter jaws, as soon as they rise above form 5, will (by their opening-spring 39, Fig. 7, secured on arms 40, extending from the rear of the jaws) be swung open and partly over compressing-bars 33, whose upper edge is at the same level as the top of form 5. When upper jaws, 16, are thus swung outward, and the lower jaws, 13, have been raised to the level of the upper edge of the compressing-bars 36, the hinged jaws 20 are moved directly downward till the projecting face 24 rests upon the upturned edge of the toe portion of the upper $d$, when, as screw 26 continues to descend, the jaws 20 will, in addition to their descending movement, also be moved bodily forward by the action of bar 30 on the rear incline, 32, of said jaws, and they will be swung inward by side bars 27 acting on inclines 34 of said jaws, whereby the part $a$ of the upper at the front end of form 5 will be turned back upon the form, and that portion of the upper that is at the sides of the form next the toe will be turned inward, and the entire toe portion of the upper that was turned upward and crimped by jaws 16 will be thus not only turned down upon the form, but will be firmly compressed thereon, and so molded that the plaits or folds will be permanently set to shape, as shown in Figs. 15 and 16, and the upper may then be taken from the form and transported or laid aside, and used at any time without in any degree losing such crimping, molding, and setting to shape, and, when applied to the last, as shown in Fig. 16, will perfectly conform thereto at the toe, while all the other parts of the edge of the upper can be readily turned down upon and secured to the insole, either by hand or the usual machinery, as before stated. An abutment, 42, secured on slide 8 by a bolt seated in a slot therein, as shown in Figs. 2, 4, 7, is so arranged on said slide as to encounter the rear ends of jaws 13 16 just before jaws 16 swing outward after rising above bars 36. Said abutment acting directly upon said jaws serves to move them against the upper with greater force than could be done through the agency of standard 10 moving with sliding bed 7. An eccentric or cam, 43, pivoted to bed 2, Figs. 1, 2, 4, 7, can be adjusted to limit the distance which slide 7 shall move when abutment 42 acts on the jaws, as stated, and a pin, 44, secured in slide 7, is arranged to encounter standard 28 when slide 7 moves rearward, and so arrest the movement of the slide as soon as the abutment 42 has moved slightly from the jaws.

I claim as my invention—

1. In a vamp-crimping machine, the combination, with jaws, substantially as shown, adapted to crimp and fold the toe of the upper, of support 5, pivotally mounted and arranged to be swung into position to co-operate with the jaws in their operation upon the leather, and to be swung out of such position for removal and replacment of the upper, substantially as specified.

2. In a vamp-crimping machine, the combination, with the crimping and folding jaws and a supporting-form, of the coacting inclines 8 and 9, with means for actuating the same, and adapted to elevate and release the jaws, substantially as specified.

3. In a vamp-crimping machine, the combination, with a supporting-form, of crimping jaws, substantially as described, arranged to move toward such form in a direction at right angles to the plane thereof, whereby the toe of the vamp is turned above and at right angles to such plane, substantially as specified.

4. In a vamp-crimping machine, the combination, with the supporting-form, of crimping-jaws constructed and arranged, substantially as shown, to be moved toward such form in a direction at right angles with the plane thereof, and to be closed against and released from the sides of the form, substantially as specified.

5. In a vamp crimping machine, the jaws 16, toothed as described, and arranged to be moved into co-operation with the supporting-form in a direction at right angles to the plane thereof, substantially as specified.

6. In a vamp-crimping machine, the combination of toothed jaws 16 and smooth-faced jaws 13, arranged to coact therewith, substantially as specified.

7. In a vamp-crimping machine, the jaws 16, formed with diminishing crimping-teeth 18, and with a smooth line or border of the face adjacent to the teeth, substantially as specified.

8. In combination with jaws adapted to crimp, turn, and hold the upper, substantially as set forth, the coacting jaws constructed and arranged to fold and compress the crimped edge upon the supporting-form, substantially as specified.

9. In combination with jaws adapted to hold the projecting edge of the upper at right angles to the plane of the form, jaws 20, provided with a threefold motion—that is, adapted to move toward the plane of the supporting-form, to move along the same toward the heel portion, and to swing inward over the same, substantially as specified.

10. The jaws 20, formed with a hinged extension, 29, for supporting and actuating the jaws, substantially as specified.

11. The jaws 20, formed or provided with inclines 32 33 and coacting bars 30 31, and means for actuating them, substantially as specified.

12. In combination with pivotal jaws 20, die 35, arranged to extend across the joint between the jaws, substantially as specified.

13. The jaws 20, formed with side inclines, 34, and bars 27, to act thereon to close the jaws together, substantially as specified.

14. The combination of sliding bed 7, the crimping and holding jaws thereby supported, the elevating incline 8, and its adjustable abutment 42, arranged to force the jaws against the upper, substantially as specified.

15. The combination of supporting-form 5, toothed crimping-jaws 16, securing-jaws 13, folding jaws 20, and means for actuating the respective jaws, substantially as specified.

16. In a crimping-machine, the combination of two pairs of jaws and means for actuating the same, one pair being adapted to turn and crimp the upper, and to be swung open when the second pair are in contact with the upper and in position to secure the same to the form, substantially as specified.

17. The herein-described method of preparing the upper or vamp of boots and shoes for lasting, the same consisting in crimping, folding, and setting to form, substantially as described, the toe portion thereof when supported upon a form and before applying the upper to the last and insole, substantially as specified.

OLIVER G. CRITCHETT.

Witnesses:
T. W. PORTER,
EUGENE HUMPHREY.